United States Patent
Clark et al.

(10) Patent No.: US 9,836,047 B2
(45) Date of Patent: Dec. 5, 2017

(54) AERIAL VEHICLE DATA COMMUNICATION SYSTEM

(71) Applicant: Kespry, Inc., Menlo Park, CA (US)

(72) Inventors: Robert Parker Clark, Palo Alto, CA (US); John D. Laxson, San Francisco, CA (US); Paul Doersch, San Francisco, CA (US)

(73) Assignee: Kespry, Inc., Menlo Park, CA (US)

( * ) Notice: Subject to any disclaimer, the term of this patent is extended or adjusted under 35 U.S.C. 154(b) by 0 days.

(21) Appl. No.: 14/735,747

(22) Filed: Jun. 10, 2015

(65) Prior Publication Data

US 2016/0363929 A1 Dec. 15, 2016

(51) Int. Cl.
*G05D 1/00* (2006.01)
*G05G 5/00* (2006.01)
(Continued)

(52) U.S. Cl.
CPC .......... *G05D 1/0011* (2013.01); *B64C 39/024* (2013.01); *B64F 1/00* (2013.01);
(Continued)

(58) Field of Classification Search
CPC .... G05D 1/0011; G05D 1/101; G05D 1/0022; B64C 39/024; B64C 2201/042; B64C 2201/146; B64F 1/00; G08G 5/0034
See application file for complete search history.

(56) References Cited

U.S. PATENT DOCUMENTS

| 5,521,817 A | 5/1996 | Burdoin et al. |
| 7,756,134 B2 | 7/2010 | Smith et al. |

(Continued)

FOREIGN PATENT DOCUMENTS

| DE | 10 2009 040529 A1 | 4/2011 |
| EP | 2138921 A2 | 12/2009 |

OTHER PUBLICATIONS

Invitation to Pay Additional Search Fees in PCT Application No. PCT/US2016/036489, dated Aug. 19, 2016.
(Continued)

*Primary Examiner* — Frederick Brushaber
(74) *Attorney, Agent, or Firm* — Knobbe, Martens, Olson & Bear, LLP (57) ABSTRACT

A data communication system for unmanned aerial vehicles includes communication links comprising a low-throughput capacity communication link and a high-throughput capacity communication link. The data communication system can also include a base station, to which the unmanned aerial vehicles send aerial data, and from which the unmanned aerial vehicles receive command signals. As the unmanned aerial vehicles perform missions in an open, distant airspace, the unmanned aerial vehicles can gather large volume data such as aerial images or videos. The data communication system allows opportunistic transfer of the gathered aerial data from the unmanned aerial vehicles to the base station when a high-throughput communication link is established. The data communication system allows constant communication between the base station and the unmanned aerial vehicles to send and receive low volume, operation-critical data, such as commands or on-going flight path changes, using a low-throughput communication link.

12 Claims, 5 Drawing Sheets

(51) Int. Cl.
*G05D 1/10* (2006.01)
*B64C 39/02* (2006.01)
*B64F 1/00* (2006.01)
*G08G 5/00* (2006.01)

(52) U.S. Cl.
CPC ............ *G05D 1/0022* (2013.01); *G05D 1/101* (2013.01); *G08G 5/0034* (2013.01); *B64C 2201/042* (2013.01); *B64C 2201/146* (2013.01)

(56) References Cited

U.S. PATENT DOCUMENTS

| | | | |
|---|---|---|---|
| 7,769,028 B2 | 8/2010 | Boley et al. | |
| 7,894,509 B2 | 2/2011 | Smith et al. | |
| 7,990,860 B2 | 8/2011 | Smith et al. | |
| 8,064,464 B2 | 11/2011 | Knazik et al. | |
| 8,300,653 B2 | 10/2012 | Smith et al. | |
| 8,346,163 B2 * | 1/2013 | Bartlett | H04B 1/69 327/113 |
| 8,493,902 B2 | 7/2013 | Suri et al. | |
| 8,503,972 B2 * | 8/2013 | Haler | G01S 5/0009 455/103 |
| 8,516,153 B2 | 8/2013 | Smith et al. | |
| 8,908,573 B1 * | 12/2014 | Wang | H04L 5/26 370/280 |
| 8,924,044 B1 | 12/2014 | Wang et al. | |
| 2007/0258459 A1 * | 11/2007 | Smith | H04L 45/00 370/395.2 |
| 2007/0291751 A1 * | 12/2007 | Smith | H04L 45/00 370/389 |
| 2007/0294393 A1 * | 12/2007 | Smith | H04L 47/10 709/224 |
| 2007/0297320 A1 * | 12/2007 | Brummette | F42D 5/04 370/208 |
| 2008/0215204 A1 * | 9/2008 | Roy | G05D 1/0044 701/28 |
| 2008/0279558 A1 * | 11/2008 | Capron | H04B 10/112 398/118 |
| 2010/0256839 A1 * | 10/2010 | Fitzpatrick | B64C 39/024 701/8 |
| 2011/0103293 A1 * | 5/2011 | Gale | H04W 4/046 370/315 |
| 2013/0248656 A1 * | 9/2013 | Mohamadi | H04W 16/26 244/190 |
| 2014/0168010 A1 * | 6/2014 | Mohamadi | H04B 7/18506 342/357.39 |
| 2014/0172194 A1 * | 6/2014 | Levien | G08G 5/0091 701/2 |
| 2014/0348140 A1 | 11/2014 | Atkinson | |
| 2015/0254988 A1 * | 9/2015 | Wang | G05D 1/0214 701/3 |
| 2015/0316927 A1 * | 11/2015 | Kim | G03B 15/006 701/2 |
| 2015/0358773 A1 * | 12/2015 | Huang | H04W 4/02 455/456.1 |

OTHER PUBLICATIONS

Search Report and Written Opinion in International Case No. PCT/US2016/036489 dated Oct. 11, 2016.

* cited by examiner

AERIAL VEHICLE DATA COMMUNICATION SYSTEM

BACKGROUND

Field

The described technology generally relates to unmanned aerial vehicles and, more specifically, to data communication systems of unmanned aerial vehicles.

Description of the Related Art

An unmanned aerial vehicle, also commonly referred to as drone, can travel through a variety of environments, such as indoor, outdoor, and/or mixed indoor and outdoor environments. In some cases, an unmanned aerial vehicle can be configured to conduct surveillance, security, delivery, monitoring, or other tasks that can comprise combining movement and data collection. The unmanned aerial vehicle can travel over surfaces on which the unmanned aerial vehicle cannot safely land (e.g., water).

SUMMARY

The methods and devices of the described technology each have several aspects, no single one of which is solely responsible for its desirable attributes.

In one embodiment, a system includes an unmanned aerial vehicle, a base station including a housing, a first wireless communication circuit configured to send flight command signals to the unmanned aerial vehicle using a first communication link with a first throughput capacity. The base station also includes a second wireless communication circuit configured to receive aerial data from the unmanned aerial vehicle using a second communication link with a second throughput capacity, wherein the second throughput capacity is higher than the first throughput capacity. The system also includes a user interface device configured to generate and send a flight plan and/or components thereof to the base station for forwarding to the unmanned aerial vehicle.

In another embodiment, a method includes executing a flight plan with an unmanned aerial vehicle, gathering aerial data from sensors attached to the unmanned aerial vehicle, receiving flight commands at the unmanned aerial vehicle through a first communication link, and sending at least some of the aerial data from the unmanned aerial vehicle through a second communication link when the second communication link is established, wherein the second communication link has a higher throughput capacity than the first communication link.

In another embodiment, a base station apparatus for an unmanned aerial vehicle includes a low-throughput capacity communication circuit configured to send flight command signals to the unmanned aerial vehicle through a low-throughput communication link, and a high-throughput capacity communication circuit configured to opportunistically receive aerial data from the unmanned aerial vehicle through a high-throughput communication link, wherein the low-throughput capacity communication link has a lower probability of failure than the high-throughput capacity communication link.

BRIEF DESCRIPTION OF THE DRAWINGS

These drawings and the associated description herein are provided to illustrate specific embodiments of the described technology and are not intended to be limiting.

DETAILED DESCRIPTION

Various aspects of the novel systems, apparatuses, and methods are described more fully hereinafter with reference to the accompanying drawings. Aspects of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of or combined with any other aspect. For example, an apparatus may be implemented or a method may be practiced using any number of the aspects set forth herein. In addition, the scope is intended to encompass apparatus and/or methods which are practiced using structure and/or functionality in addition to or different than the various aspects specifically set forth herein. It should be understood that any aspect disclosed herein might be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wired and wireless technologies, system configurations, networks, including optical networks, hard disks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The term "unmanned aerial vehicle," or "UAV," as used herein, generally refers to a vehicle that is configured to operate without substantial or any involvement from an on-board operator (e.g., a pilot or driver). An unmanned aerial vehicle can operate autonomously or semi-autonomously. An unmanned aerial vehicle can be an aircraft that is configured to automatically take off and land on a surface. In some cases, an unmanned aerial vehicle can automatically travel from one location to another without any operator involvement. In some cases, an unmanned aerial vehicle can travel a far distance from a starting point. The distance can be far enough that the unmanned aerial vehicle cannot return to a starting point without refueling or recharging at an intermediate location. An unmanned aerial vehicle can be configured to land on a landing pad and/or charge at a charging station.

An unmanned aerial vehicle can be used to perform missions in an open and/or distant airspace. The missions performed by the unmanned aerial vehicle can be pre-programmed to one or more processors of the unmanned aerial vehicle or can be communicated to the one or more processors during its flight in real time. Furthermore, the unmanned aerial vehicle can be configured to gather and/or store aerial data and/or send the gathered and/or stored aerial data to at least one stationary device forming a communication portal as it performs its missions. As the unmanned aerial vehicle performs its missions, it may fly long distances far away from the communication portal(s), introducing challenges in keeping constant communications with the communication portal(s). An unmanned aerial vehicle can use an opportunistic dual link communication system as disclosed herein to maintain at least one low-throughput communication link for receiving command data/signals continuously or essentially continuously with a communication portal throughout its flight while opportunistically transferring aerial data to the same or a different communication portal using a high-throughput link, which can be intermittently established during the flight. As used herein, command signals means signals, typically digital data, received by the unmanned aerial vehicle that provide instructions to the unmanned aerial vehicle that are executed when performing a flight. Such command signals can be delivered to the aerial vehicle before or during the flight. Aerial data is data gathered by the unmanned aerial vehicle with sensors during the flight. Aerial data may include what may be referred to as payload data, which means data gathered by the unmanned aerial vehicle regarding its surroundings such as images, video, LIDAR, ultrasound, processed data such as 3D mapping data, or environmental measurements such as gas sensor data. The payload data is typically the information the flight is being performed to collect and deliver to the user. Aerial data also includes what may be termed telemetry data, which is data regarding the status and activities of the unmanned aerial vehicle during the flight such as velocity, position, attitude, temperature, and rotor speeds. Such data may be collected to retain records or logs of flight activity and perform diagnostics.

Figure 1:
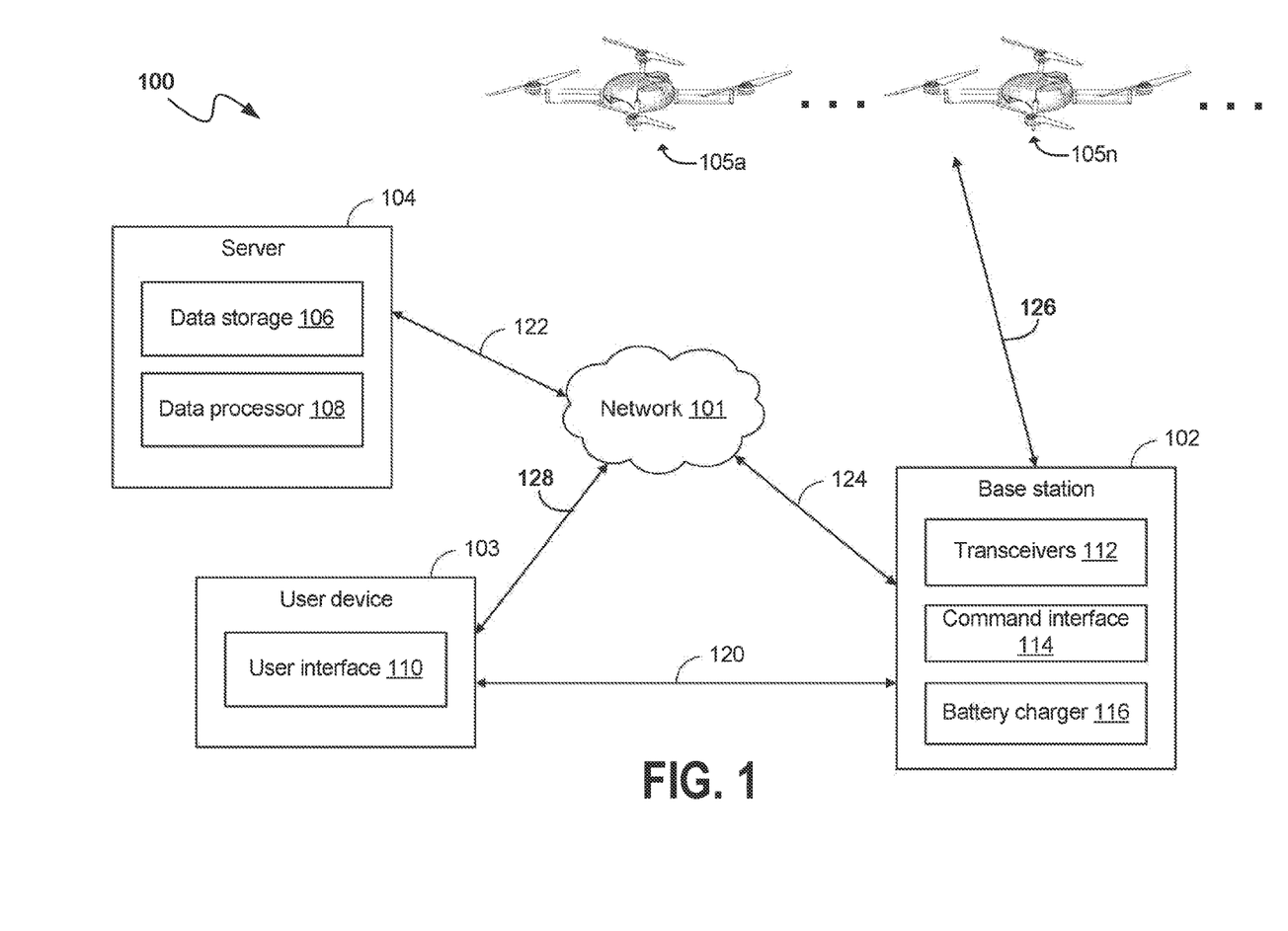
FIG. 1 is a diagram showing an example unmanned aerial vehicle system according to one embodiment.

FIG. 1 is a diagram showing an example unmanned aerial vehicle system according to one embodiment. The illustrated system 100 includes a base station 102, a user device 103, a server 104, and one or more unmanned aerial vehicles 105a, . . . , 105n, . . . , which are collectively or individually referred to herein as the unmanned aerial vehicle(s) 105. The base station 102, the user device 103, and the server 104 can be in communication via a network 101 using communication links 122, 124, 128. The user device 103 and the base station 102 can also be in communication using a local communication link 120, and the base station 102 and the unmanned aerial vehicles 105 can be in communication using one or more aerial vehicle communication links 126. The base station 102 may include transceivers 112, a command interface 114, and a battery charger 116. The server 104 may include a data storage 106 and a data processor 108, and the user device 103 may include a user interface 110. Although the unmanned aerial vehicles 105 illustrated in FIG. 1 are quadcopters each having four arms with their respective rotors, the disclosure herein can be implemented in other types of unmanned aerial vehicles such as a multirotor helicopter having a different number of arms and/or rotors or an aerial vehicle other than a multirotor helicopter such as a fixed wing aerial vehicle. Further details of the unmanned aerial vehicles 105 are discussed in connection with FIG. 3 below.

The network 101 can be a global network which may include or comprise the Internet, enabling communication between remotely located devices and servers, and as such the communication links 122, 124, 128 can be implemented using wireless communication technologies currently implemented for mobile telephone and smart phone communications such as Long Term Evolution (LTE) or any other suitable technologies (e.g. GSM, other 3GPP family protocols) generally having throughput data rates of 300 kbps or above. In some embodiments, one or more of the communication links 122, 124, 128 can be implemented using wired communication technologies such as fiber-optic cables or any other suitable technologies providing a similar throughput range as discussed above. Although not illustrated in FIG. 1, the unmanned aerial vehicles 105 may be equipped with communication circuits to interface with network 101 using established mobile telephone network protocols and infrastructures.

The local communication link 120 between the user device 103 and the base station 102 can be implemented, for example, with a local Wi-Fi network (described further below) or any other suitable network generally allowing data rates of 300 kbps or above. In some embodiments, the base station 102 may act as a local network hub such as a Wi-Fi access point, and in other embodiments, the user device 103 may act as a local network hub. In other embodiments, a separate device (not shown) may be used to implement a local network hub.

The aerial vehicle communication link 126 between the base station 102 and one of the unmanned aerial vehicles 105 can be implemented with a combination of at least two distinct communication links, which although not shown separately in FIG. 1, will be referred to herein as links 126a and link 126b. The first aerial vehicle communication link 126a may be implemented, for example, with a local communication link using the 900 MHz band (e.g. 902-928 MHz ISM/amateur radio band) or any other suitable link generally having a throughput capacity of less than 300 kbps (kilobits per second) and at least 5 kilometers of range with low (preferably no) packet loss, preferably 10 kilometers of range with low (preferably no) packet loss, and more preferably 60 kilometers of range with low (preferably no) packet loss. The second aerial vehicle communication link 126b may be implemented, for example, with a local Wi-Fi network link or any other suitable network having a throughput capacity of equal to or greater than 300 kbps, and a smaller range than the link 126a described above. For example, the range of the second link 126b may be 100 to 1000 meters, for example. As defined herein, a "high throughput capacity" link is one with a throughput capacity of equal to or greater than 300 kbps, and a "low throughput capacity" link is one with a throughput capacity of less than 300 kbps. It is to be noted that the throughput capacities and distance ranges discussed above are only examples and not absolute, and as described herein the level of throughput and the associated degree of reliability of a communication link may be a relative measure between the at least two communication links implementing the aerial vehicle communication links 126, regardless of the actual numerical throughput capacities, reliabilities, and distance ranges of the links.

As used herein, the term "throughput capacity" as applied to a data communication link refers to the bits per second transmitted by the transmitting side of the link to the receiving side of the link, including overhead such as parity and other error correction bits, during the time period that a packet is being transmitted from the transmitter to the receiver, however encoded or modulated, whether as symbols encoding multiple bits each such as quadrature amplitude modulation (QAM) or single bits at a time such as binary modulation, and whether over a single or multiple parallel carriers or streams, such as in orthogonal frequency-division multiplexing (OFDM) or multiple input multiple output (MIMO) systems. The "throughput capacity" of a link is therefore not the same as the actual rate of successful user data bits decoding at the receiver after error correction, which will be lower, and will be dependent on both the details of the communication protocol being used and the channel conditions at any particular moment.

As used herein, the "reliability" of a communication link in a given time period is defined as the number of user data bits (i.e. excluding control frames, error correction bits, and other overhead) correctly decoded in the given time period at the receiver without a packet loss that results in or would require subsequent retransmission of the user data or transmission of additional error correction information for the receiver to successfully decode the bits, divided by the total number of user data bits transmitted in the given time period. Generally speaking, a higher throughput capacity link has a lower reliability than a lower throughput capacity link. Part of this is due to the fact that the raw bit error rate at a receiver increases dramatically as received energy per bit drops. Thus, for equal transmission energies, the bit error rate at the receiver will increase at higher bit transmission rates. The chance of packet loss thus increases at the receiver. This can be compensated for in a few ways, such as making the receiver circuit more complex and sensitive or with special receiver designs such as rake receivers, or by increasing the complexity of the communication protocol such as by using more complex error correction codes or automatic repeat request or automatic repeat query (ARQ) schemes. These may compensate for the higher raw bit error rate, but increase the probability of hardware or software error at the receiver and the transmitter. For high throughput capacity links, especially multiple access network communication links, reliability at longer ranges drops even further not just due to lower received signal strength producing a higher raw bit error rate, but also because longer signal transit times between the transmitter and receiver complicate the timing of control frames and other overhead that are necessary in a high throughput capacity link, which can also result in dropped packets and other unrecoverable errors. It will also be appreciated that the reliability of a link operating at any given throughput capacity over any given range can be improved by increasing the transmission power and/or using directional antennas to focus the transmit power onto the receiver, but regulatory and other practical limits to this approach remain, and further increase the complexity of the system which increases the probability of hardware and/or software failure.

A given transmitter, receiver, or communication circuit may be configured for a different throughput capacity at different times depending on the timing and modulation encoding that the circuit is using or is configured to be using to send or receive a given packet. Some circuits can operate at a variety of throughput capacities at different times, based on user selection, negotiated protocol parameters between devices, or sensing of signal strengths or channel conditions.

The server 104 can be a remote server configured to, for example, receive, process, and store aerial data collected by the unmanned aerial vehicles 105. The server 104 can receive the aerial data from the base station 102 or the user device 103 or the unmanned aerial vehicle 105 through the network 101 using the communication links 122, 124, 128. Further details of the data communications between the unmanned aerial vehicles 105 and the base station 102 are discussed in connection with FIGS. 2, 3 below. In some embodiments, the server 104 can be implemented with multiple servers in multiple locations, and one or more parts of the server 104 may be distributed and in communication with one another through the network 101. The data storage 106 can be a computer storage device (e.g., hard disk drive (HDD) storage, solid state drive (SSD) storage, or flash memory) to store data received through the network 101. The data processor 108 may be implemented with one or more suitable computer processors capable of processing the data received thought the network 101, such as aerial data from the unmanned aerial vehicles 105.

The base station 102 can be a portable module placed near a take-off point for the flight path of an unmanned aerial vehicle that can collect data from the unmanned aerial vehicles 105. In some embodiments, the base station 102 may also act as a hub to the local network between the unmanned aerial vehicles 105 and the user device 103. The base station 102 can include transceivers 112, a command interface 114, and a battery charger 116. The transceivers 112 can be devices capable of transmitting and receiving data to and from a system, device, or module external to the unmanned aerial vehicle. For example, the transceivers 112 may include radio frequency (RF) transceivers capable of communicating data over a Wi-Fi network, LTE network, or any other suitable network in various frequency bands or channels, such as 900 MHz, 2.4 GHz, 5 GHz, etc. In some embodiments, the transceivers 112 may be implemented with a combination of separate transmitters and receivers. The command interface 114 can be an interface configured to receive user command inputs, and the battery charger 116 can be configured to receive or connect to one or more batteries of the unmanned aerial vehicles 105. An example implementation of the base station 102 is further discussed in connection with FIG. 4 below.

The user device 103 can be a portable user device, such as a tablet computer, smart phone, or laptop computer capable of receiving user inputs and transmitting user input data to the base station 102 to affect the operation of the unmanned aerial vehicle. For example, the user input data may include commands or flight plan changes, and the user device 103 may send the commands to the base station 102 using the local communication link 120. In some embodiments, the user input data may include a designated area of interest for the unmanned aerial vehicle 105 to observe and gather relevant aerial data. In some embodiments, the user input data may include specific areas to avoid when the unmanned aerial vehicle 105 is performing its mission. The base station 102 can process and/or send the commands received from the user device 103 to the unmanned aerial vehicles 105 using one of the aerial vehicle communication links 126.

The user device 103 may also be configured to allow user access to the data stored in the data storage 106 of the server 104. The user device 103 may further include a transceiver (not shown), a processor (not shown), a display (not shown), and a user input means (not shown) to allow user interaction and transmitting, receiving, and processing of data. In some embodiments, the data processor 108 may transform received data for a presentment to a user of the user device 103. For example, the received aerial data may include aerial images of a selected location taken every day, and the data processor 108 may process the daily images to generate a construction or landscape progress report. The processed data can be further accessed by the user device 103 through the network 101 using the communication link 128, and the user may navigate, manipulate, and edit the processed data using the user interface 110. In some embodiments, the processing of the received data may be performed in part or in all with the user device 103. In the abovementioned example, the user device 103 may receive raw or partially processed aerial image data, and a processor (not shown) associated with the user device 103 may further process the image data for user presentation, manipulation, and editing.

In one suitable implementation, the user device 103, base station 102, and the one or more unmanned aerial vehicles 105 and communication links 120, 126b are implemented as a local area network such as a Wi-Fi network. "Wi-Fi" refers to the set of communication protocols defined in the IEEE 802.11 series of standards that define a carrier sense multiple access local area network (LAN) protocol usually but not necessarily using OFDM modulation. Commercially available Wi-Fi communication circuits and related technology commonly have throughput capacities of at least 1 Mbps, often with 2.4 or 5 GHz carriers. In this implementation, the Wi-Fi access point for the Wi-Fi LAN may be the base station 102, although it is also possible for the user device 103 to perform this function. This Wi-Fi network having a high throughput capacity can be used to communicate aerial data from the unmanned aerial vehicle(s) 105 to the base station 102 and the user device 103. Further in this implementation, the separate communication link 126a may operate with a single carrier of 902 to 928 MHz, binary modulation, and with a throughput capacity of 5 to 200 kbps. With this system, the link 126a will be more reliable over longer ranges than the link 126b. Preferably, over the time period of a data gathering flight of an unmanned aerial vehicle 105, the link 126a will be 100% reliable, that is, no packet loss requiring retransmission during the flight. This need not be true for the higher throughput capacity link 126b, which may lose and retransmit packets, and/or become available and unavailable at different times during the flight as described further below.

Figure 2:
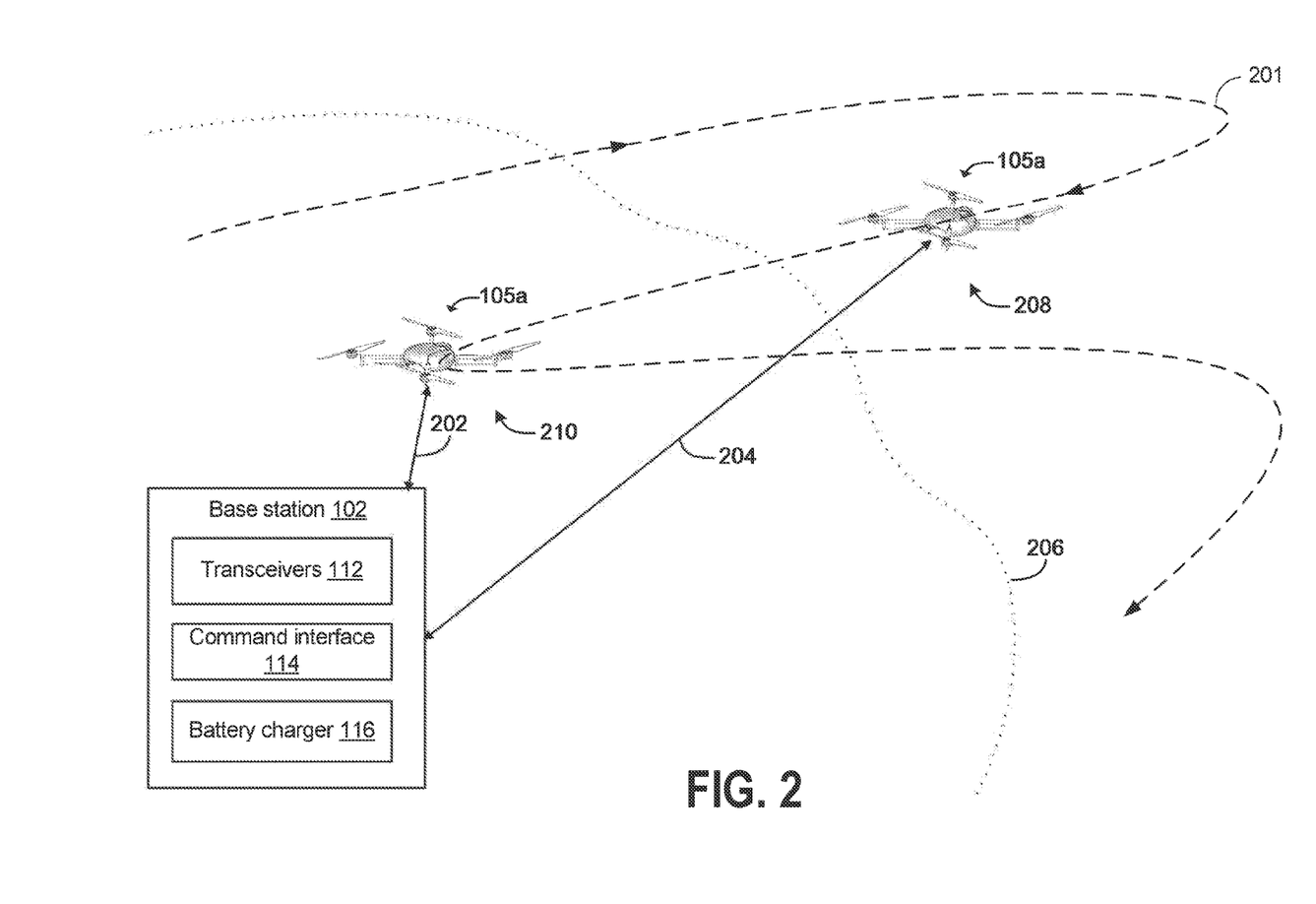
FIG. 2 is an illustration of a part of the example unmanned aerial vehicle data communication system of FIG. 1.

FIG. 2 is an illustration of a part of the example unmanned aerial vehicle data communication system of FIG. 1. The illustration in FIG. 2 includes the unmanned aerial vehicle 105a, a flight path 201, aerial vehicle communication links 202, 204, and a data link range 206. The aerial vehicle communication links 202, 204 illustrated in FIG. 2 are example instantiations of the aerial vehicle communication links 126 discussed in connection with FIG. 1 above. The data link range 206 in FIG. 2 is an unfixed, representative line showing the range (from the base station 102) in which an aerial data link (e.g., less-reliable, high-throughput link such as 2.4 GHz Wi-Fi) of the aerial communication links 126 (FIG. 1) between the base station 102 and the unmanned aerial vehicle 105a can be successfully established. A high-throughput communication link implemented with Wi-Fi technology, for example, can often be reliably established over a distance of around 200 m, and the data link range 206 in this example would be around 200 m from the base station 102. As used herein, "establishing" a link means configuring a pair of communication circuits in a manner that enables one of the communication circuits to successfully decode user data transmitted to it from the other communication circuit. For most wireless communication links, a series of control frame communications take place when a communication circuit is turned on, or travels from outside the range of a wireless transmitter/receiver to being within range of the wireless transmitter/receiver. These control frames are used to configure the circuits for subsequent user data transfer. This process of exchanging control frames to prepare one or both communication circuits for user data transfer is "establishing" the link. For a Wi-Fi communication link, for example, beacon frames, probe request frames, and other control frames may be used to configure two Wi-Fi enabled communication circuits to use the same modulation and timing for wireless communication. Such control frames may also be used to authenticate and associate a communication circuit with an existing Wi-Fi network.

In the example in FIG. 2, two example positions 208, 210 of the unmanned aerial vehicle 105a along the flight path 201 are illustrated. In the course of executing a mission, the unmanned aerial vehicle 105a may fly according to the flight path 201. In some embodiments, the flight path 201 can be determined based on the mission, known obstacles, or other surroundings. For example, the flight path 201 can be in a right-angled serpentine shape for a mission to take aerial photos of an open rectangular field. In some embodiments, the flight path 201 may be predetermined and sent to the unmanned aerial vehicle 105a before its flight begins. In other embodiments, the flight path 201 can be altered and the alteration can be communicated to the unmanned aerial vehicle 105a after the unmanned aerial vehicle 105a begins its flight.

The first position 208 of the unmanned aerial vehicle 105a in FIG. 2 is outside the data link range 206 from the base station 102. At this location, the unmanned aerial vehicle 105a may be in communication with the base station 102 using the aerial vehicle communication link 204, which may include only a low-throughput, more reliable communication link. The second position 210 of the unmanned aerial vehicle 105a is within the data link range 206 from the base station 102. At this location, the unmanned aerial vehicle 105a may be in communication with the base station 102 using the aerial vehicle communication links 202, which may include both a low- and high-throughput links.

During the execution of a mission and throughout its flight, the unmanned aerial vehicle 105a can be in continuous communication with the base station 102 using a low-throughput link of the aerial vehicle communication links 126 (FIG. 1). Using the low-throughput link of the aerial vehicle communication links 126 (FIG. 1), the unmanned aerial vehicle 105a and the base station 102 may communicate command signals, safety decisions, and telemetry information throughout its flight. For example, the unmanned aerial vehicle 105a in FIG. 2 can be in constant communication with the base station 102 using a low-throughput communication link regardless of its position (e.g., positions 208, 210) along the flight path 201. In some embodiments, loss of communication over the low-throughput link of the aerial vehicle communication links 126 (FIG. 1) can be treated as an emergency situation that triggers recovery actions, such as forced return to the takeoff location, emergency landing with parachute deployment, or other emergency measures.

In some implementations, even if the unmanned aerial vehicle is operating independently according to previously received flight path instructions, the base station 102 may send "heartbeat" packets of, for example, 2 to 4 bytes which under normal circumstances may be interpreted as a message that the base station 102 is functioning properly, detects no problems, and the unmanned aerial vehicle may continue executing flight path instructions. Small packets such as this could also be used to send simple commands such as return to base or descend immediately if a problem is detected. If more complex commands, such as sending a batch of new or modified flight path instructions, are sent, then larger packets or multiple packets would be utilized. The base station may be configured to send a command and/or a heartbeat packet to the unmanned aerial vehicle periodically, such as at least every 5 seconds or every 10 seconds. The unmanned aerial vehicle 105 may be configured to return to the take off point or other safe location if no command or heartbeat is received within a selected time window, which may also be, for example, 5 seconds or 10 seconds. Such heartbeat packets may also be sent by the unmanned aerial vehicle to the base station either independently or as an acknowledgement (ACK) packet in response to a heartbeat packet received from the base station by the unmanned aerial vehicle.

As the unmanned aerial vehicle 105a flies according to the flight path 201, the unmanned aerial vehicle 105a may get closer to and farther from the base station 102, and accordingly may weave in and out of the data link range 206. In some instances, the unmanned aerial vehicle 105a may be far away from the base station 102 and outside the data link range 206 from the base station 102 during its mission. For example, in the first position 208 in FIG. 2, the unmanned aerial vehicle 105a is outside the data link range 206, and a high-throughput link may not be successfully established between the unmanned aerial vehicle 105a and the base station 102. In this example, the unmanned aerial vehicle 105a may not communicate with the base station 102 using the high-throughput communication link of the aerial vehicle communication links 126 (FIG. 1). As discussed above, the unmanned aerial vehicle 105a in the first position 208 can still be in communication with the base station 102 using the low-throughput communication link to send and/or receive mission-critical instructions, operation-critical information, and emergency commands. It can be advantageous to use the low-throughput communication link to exchange small volume data and/or data essential to the operation of the unmanned aerial vehicle 105a since the low-throughput communication link can be established and maintained throughout the flight.

In FIG. 2, as the unmanned aerial vehicle 105a flies along the flight path 201 from, for example, the first position 208 to the second position 210, the unmanned aerial vehicle 105a gets closer to the base station 102 and within the data link range 206. It can be advantageous for the unmanned aerial vehicle 105a to send large volume data, such as aerial images or videos, sensor data, high rate telemetry, detailed status or diagnostics information collected or generated by the unmanned aerial vehicle 105a, to the base station 102 whenever a high-throughput link can be established in an opportunistic manner. In some embodiments, the unmanned aerial vehicle 105a may continuously attempt to establish a high-throughput communication link while keeping a low-throughput communication link established along the entire flight path 201. In such embodiments, the unmanned aerial vehicle 105a may periodically attempt to establish a high-throughput link to send high volume data even when the unmanned aerial vehicle 105a is outside the data link range 206. Whenever the high-throughput link is established, the unmanned aerial vehicle 105a can send or unload the high volume data to the base station 102. Based on the reliability of the high-throughput link, the packet size or any other characteristics of a communication protocol can be determined to allow an easy checksum and quick retransmission of a dropped packet, if any. In some embodiments, this opportunistic manner of high-throughput data transfer can be intelligently or dynamically adjusted, and the frequencies of the attempts to establish the high-throughput communication link may vary or become aperiodic.

In some implementations, the position of the unmanned aerial vehicle can be used to determine appropriate timing for attempting to establish or reestablish the high throughput capacity link. The unmanned aerial vehicle can estimate its distance from the base station 102, and attempt to establish the high throughput capacity link when it is estimated to be within an appropriate range for successful data transfer. The unmanned aerial vehicle may assume as a default that the base station 102 is located at the place where the unmanned aerial vehicle took off. If that is not the case, the actual position may be loaded into the unmanned aerial vehicle at the start of the flight or during the flight, for example. By only attempting to establish the high throughput capacity link when it is expected to be successful, interference with other RF functions of the unmanned aerial vehicle such as GPS signal reception can be reduced when the unmanned aerial vehicle is out of range of the high throughput capacity link by avoiding continuous probing for the link at these times. The unmanned aerial vehicle may also adjust the transmit power for the high throughput capacity link to be higher when the vehicle is on the outer periphery of the range of the high throughput capacity link or may user a higher transmit power temporarily when it is outside the usual range of the link but has especially important data to transmit. The communication circuit for the high throughput capacity link on the unmanned aerial vehicle may also store the configuration of this link, so that the communication parameters need not be negotiated and set multiple times during the flight as the link is lost and reestablished.

In some implementations, telemetry data such as the current position of the unmanned aerial vehicle may be sent to the base station 102 over the low throughput capacity link, or the base station 102 may estimate the position of the unmanned aerial vehicle based on its knowledge of the flight path. This information can be used at the base station to configure a directional antenna used for the high throughput capacity link. As another alternative, instead of receiving position information from the unmanned aerial vehicle as digital data over the low throughput capacity link, directional receiving antennas for the low throughput capacity link may determine the current direction from the base station 102 to the unmanned aerial vehicle when packets are sent from the unmanned aerial vehicle to the base station 102. This directional information can be used to configure the directionality of the antenna for the high throughput capacity link, thereby steering the high throughput capacity link with the low throughput capacity link. The same principal could be implemented on the unmanned aerial vehicle as well, with a directional antenna that is configured based on the direction from the unmanned aerial vehicle to the base station based on their known/estimated positions.

It can be advantageous to allow opportunistic large volume data transfer as described herein as the gathered data can be sent to the remote server 104, for example, and become readily accessible with little delay or even during the flight. For instance, a user may not need to wait for all the gathered data to be transferred or uploaded to the server 104 after a flight is completed as at least part of the transfer have already taken place during the flight. It can be advantageous to use the separate low- and high-throughput links based on the types of data to transfer between the unmanned aerial vehicle 105a and the base station 102. The separate low- and high-throughput links can have levels of reliability associated with them. Based on the critical or uncritical nature of data to the mission, data size, or any other characteristic of the data, one of the low- and high-throughput links (having their associated levels of reliability) can be selected to transfer the data of interest between the unmanned aerial vehicle 105a and the base station 102. In some embodiments, the selection between the low- and high-throughput links can be predetermined and pre-programmed in one or more processors of the unmanned aerial vehicle 105a. For example, it can be predetermined that the aerial images and/or videos gathered during a mission is not critical to maintain reliable flight operations during the mission, and the unmanned aerial vehicle 105a may be configured to only send the image and/or video data when a high-throughput link is available to allow more mission-critical data communication to occur continuously using the low throughput capacity link.

In other embodiments, the selection between the low- and high-throughput links can be dynamically performed at least in part during the flight in a deterministic manner and/or on an ad-hoc and/or case-by-case basis. In some embodiments, factors other than those that relate to the data type and volume can affect the selection between the two links, and such factors may include the availability of one or more of the aerial communication links 126 (FIG. 1), the operational or emergency status of the unmanned aerial vehicle 105a, and unexpected or arising developments surrounding the unmanned aerial vehicle 105a. For example, under normal operations, the unmanned aerial vehicle 105a may be configured to send aerial images to the base station 102 only when a high-throughput link can be established, but upon encountering an emergency situation or a specified object of interest, the unmanned aerial vehicle 105a can be configured send a specific aerial image using a low-throughput link even when a high-throughput link is unavailable. The dual link data communication system thus allows adaptive and effective data communication based on the cost-benefit assessment of requisite throughput capacities and critical nature of data.

In another embodiment, the base station 102 can be replaced with a dedicated hub or relay for high-throughput communication. It is to be noted that although FIG. 2 depicts one unmanned aerial vehicle 105a, in some embodiments the system 100 (FIG. 1) includes a plurality of unmanned aerial vehicles 105 to execute a group mission. In such embodiments, the base station 102 or a dedicated central relay can be in communication with the plurality of unmanned aerial vehicles 10, each of which opportunistically transfers large volume data as described herein. The base station 102 can further transfer the data collected from the group mission to a remote server 104 (FIG. 1) through a network 101 as discussed above in connection with FIG. 1.

Figure 3:
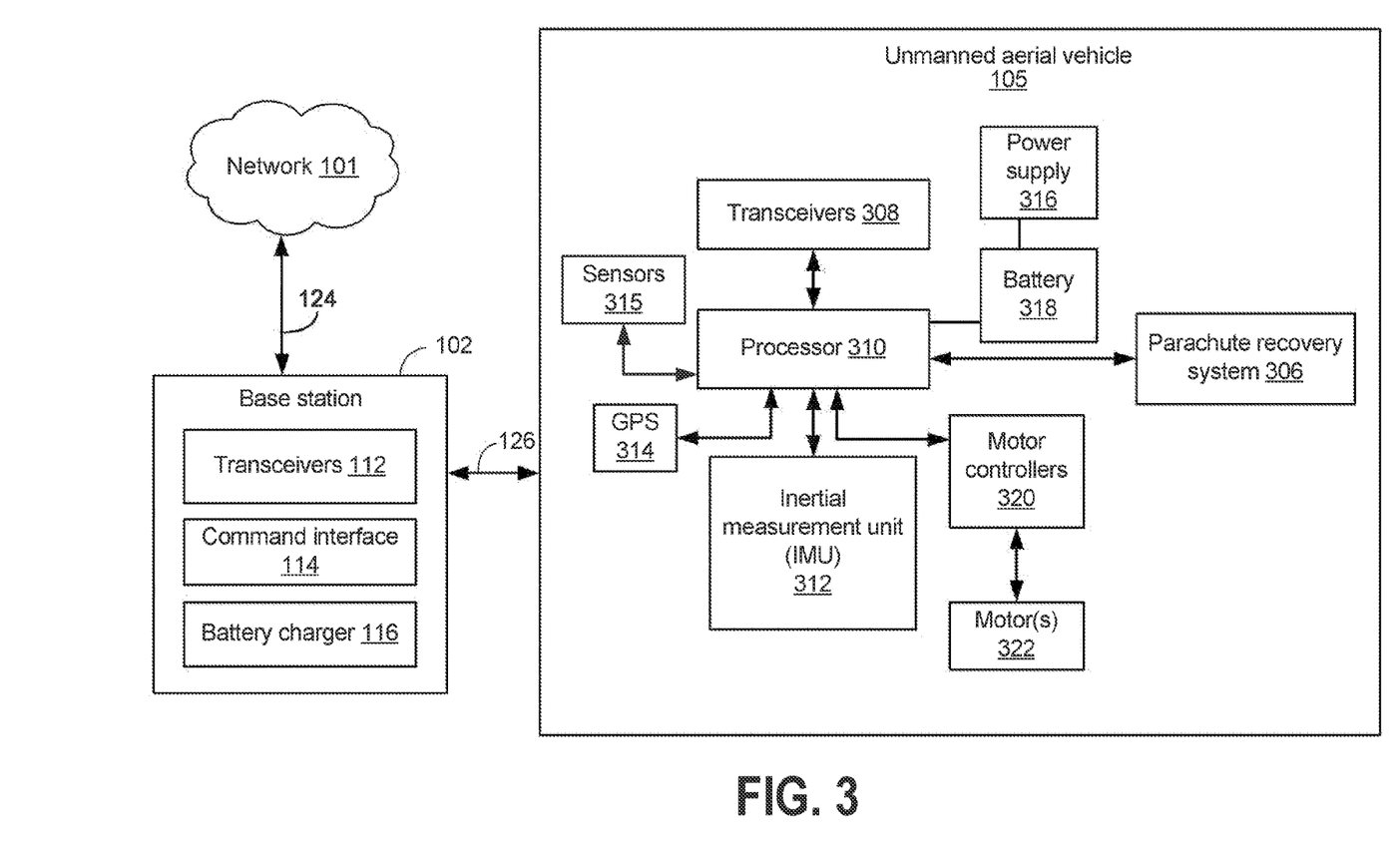
FIG. 3 is a diagram showing an example base station and an example unmanned aerial vehicle according to one embodiment.

FIG. 3 is a diagram showing an example base station and an example unmanned aerial vehicle according to one embodiment. As discussed above in connection with FIGS. 1 and 2, the base station 102 is in communication with the unmanned aerial vehicle 105 via the aerial vehicle communication links 126. The unmanned aerial vehicle 105 illustrated in FIG. 3 includes a processor 310 in communication with a state estimator that may be an inertial measurement unit (IMU) 312. The processor 310 is in further communication with one or more transceivers 308, sensors 315, a global positioning system (GPS) module 314, and motor controllers 320, which are in communication with motors 322. The primary operation system 104 further includes a power supply 316 and a battery 318, which provides power to one or more modules of the unmanned aerial vehicle 105, including the processor 310. The transceivers 308 and the GPS module 314 may be in further communication with their respective antennas (not shown). The unmanned aerial vehicle 105 may also include a parachute recovery system 306, which may be in communication with one or more modules in the unmanned aerial vehicle 105, including the processor 310. In some embodiments, the parachute recovery system 306 may include a dedicated recovery processor (not shown) in communication with a recovery state estimator (not shown) that may also be an additional IMU (not shown). The unmanned aerial vehicle 105 may include additional or intermediate modules, drivers, controllers, circuitries, lines of communication, and/or signals not illustrated in FIG. 3.

The unmanned aerial vehicle 105 can perform its regular operation according to instructions executed by the processor 310 to, for example, take a course of action for a mission. The processor 310 can be a microprocessor capable of communicating with various modules illustrated in FIG. 3 executing instructions either pre-programmed or received during a mission, for example. The processor 310 may receive data from the sensors 315, the transceivers 308, the GPS module 314, the IMU 312, and the motor controllers 320 to evaluate the status of the unmanned aerial vehicle 105 and determine a course of action. The status of the aerial vehicle can also be determined based on data received through the sensors 315 and/or preloaded data. For example, the height of the unmanned aerial vehicle 105 above ground can be determined by the processor 308 based on a digital elevation model (DEM) of a world elevation map or with LIDAR or a barometer. In some embodiments, the unmanned aerial vehicle 105 may include multiple processors of varying levels of computing power and reliability to execute low-level instructions or run high-level application code or a virtual machine. In such embodiments, one or more of the functionalities of the processor 310 described herein may instead be performed by another processor in the unmanned aerial vehicle 105.

The transceivers 308 can be devices capable of transmitting and receiving data to and from a system, device, or module external to the unmanned aerial vehicle. For example, the transceivers 308 may include radio frequency (RF) transceivers capable of communicating data over a Wi-Fi network or any other suitable network in various frequency bands or channels, such as 900 MHz, 2.4 GHz, 5 GHz, etc. In some embodiments, the transceivers 308 may be implemented with a combination of separate transmitters and receivers. The sensors 315 may include one or more proximity sensors using, for example, infrared, radar, and/or sonar technology. The sensors 315 may also include other types of sensors gathering data regarding visual fields, auditory signals, and/or environmental conditions (e.g., temperature, humidity, pressure, etc.). The GPS module 314 may include a GPS transceiver and/or a GPS driver configured to receive raw and/or processed GPS data such as ephemerides for further processing within the GPS module, with the processor 310, or both.

The IMU 312 may include a stand-alone IMU chip containing one or more magnetometers, gyroscopes, accelerometers, and/or barometers. In some embodiments, the IMU 312 may be implemented using a combination of multiple chips or modules configured to perform, for example, measuring of magnetic fields and vehicle orientation and acceleration and to generate related data for further processing with the processor 310. The motor controllers 320 may include a controller device or circuit configured to interface between the processor 310 and the motors 322 for regulating and controlling speed, torque, or other operational parameters of their respective, coupled motors 322. In some embodiments, one or more motor control schemes, such as a feedback control loop, may be implemented with the processor 310 and/or the motor controllers 320. The motors 322 may include electrical or any other suitable motors coupled to their respective rotors of the unmanned aerial vehicle to control their rotary wings, for example.

The parachute recovery system 306 can be responsible for recovery operation of the unmanned aerial vehicle to, for example, safely deploy a parachute and land the unmanned aerial vehicle 105. The parachute recovery system 306 may include a parachute and an electromechanical deployment mechanism. The power supply 316 may include a circuitry such as voltage regulators with outputs directly powering various modules of the unmanned aerial vehicle 105, and the battery 318 can provide power to the power supply 316. In some embodiments, the battery can be a multi-cell lithium battery or any other suitable battery capable of powering the unmanned aerial vehicle 105. In some embodiments, the battery 318 of the unmanned aerial vehicle 105 can be removable for easy swapping and charging. The unmanned aerial vehicle 105 may also include one or more cameras (not shown) to gather images and/or video, a microphone (not shown) to gather audio data, and a memory storage device (e.g., random-access memory, read-only memory, flash memory, or solid state driver (SSD) storage) (not shown) to store data collected from the sensors 315, data processed in the processor 310, or preloaded data.

Figure 4:
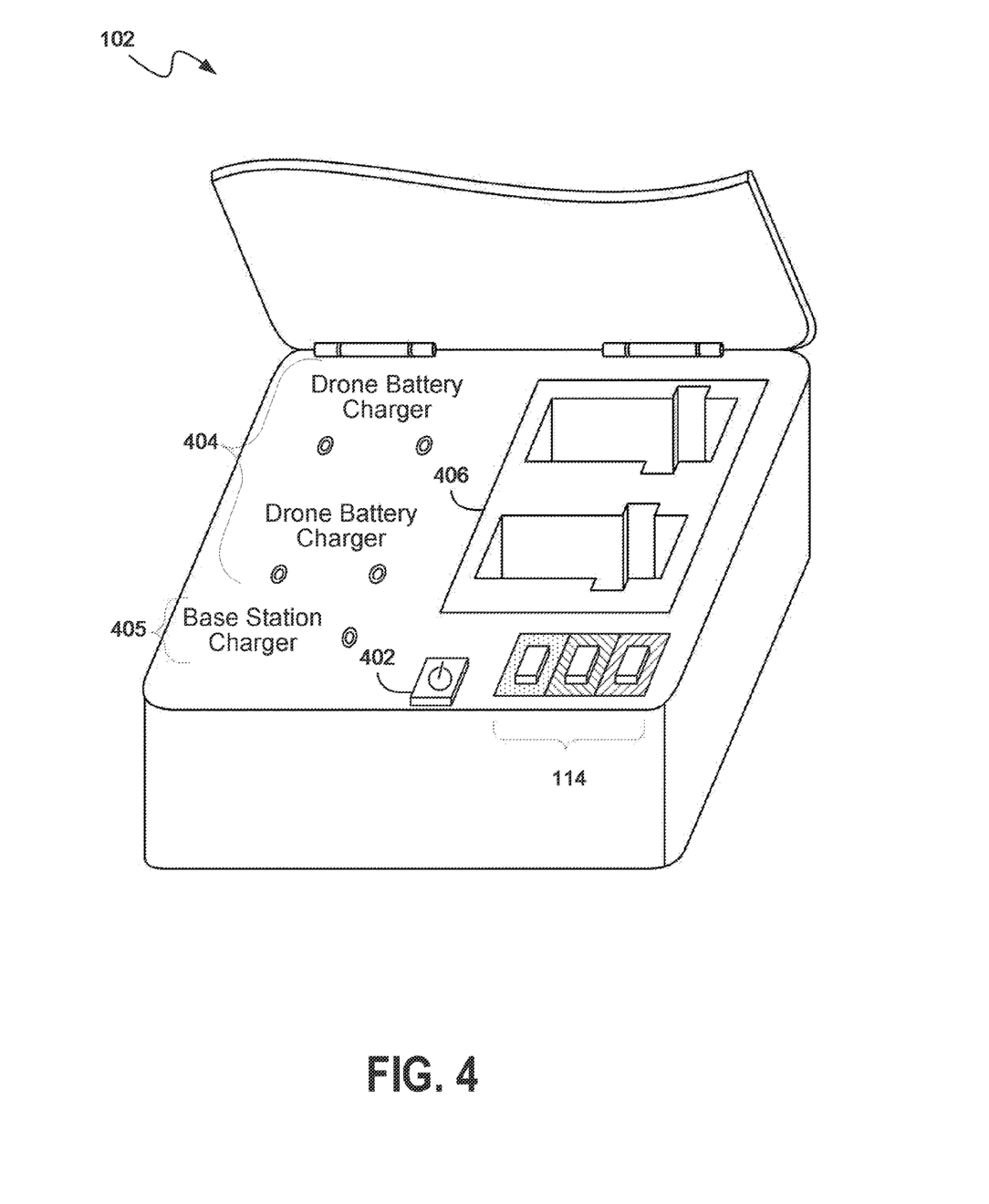
FIG. 4 is an illustration showing an example base station according to one embodiment.

FIG. 4 is an illustration showing an example base station according to one embodiment. The example base station 102 in FIG. 4 includes a power button 402, battery charger status indicators 404, a base station charger indicator 405, and battery charger slots 406. In this example the command interface 114 is implemented with three buttons. The base station 102 can be implemented with a housing that encloses various modules such as the transceivers 112 (FIG. 1) and the battery charger 116 (FIG. 1) for charging the battery 318 (FIG. 3) of the unmanned aerial vehicle 105 (FIG. 3). The base station 102 can be implemented to be a portable module having its own battery (not shown) enclosed in its housing. In some embodiments, the base station 102 can include a charger port (not shown) or a power cord (not shown) to power the battery charger and allow charging of its own battery. In some embodiments, the housing of the base station 102 may include a handle (not shown) to enhance its portability, and as illustrated in FIG. 4 the base station 102 may include a cover. It can be advantageous to implement the base station 102 implemented as a portable in-field unit accompanying the unmanned aerial vehicle 105. As discussed above in connection with FIGS. 1-3, the base station 102 can be an all-in-one unit that can function as an intermediary for data transfer using the transceivers 112 (FIG. 1), as a user command device providing or altering in-field instructions to the unmanned aerial vehicle 105, and as a unmanned aerial vehicle battery charging station using the battery charger 116 (FIG. 1).

In some embodiments, the base station 102 can include indicators such as the battery charger status indicators 404 and the base station charger indicator 405 illustrated in FIG. 4. The battery charger status indicators 404 and the base station charger indicator 405 can be implemented with light emitting diodes (LEDs) or any suitable visual and/or auditory indicators to notify the charging status of one or more batteries. The base station 102 can also include the power button 402 to allow powering off to conserve its own battery power when a field operation or a mission is not in progress (e.g., during the trip to and from the field). In some embodiments, the battery charger slots 406 can be openings configured to accept generic removable batteries from the unmanned aerial vehicle 105 for charging. In other embodiments, the battery charger slot 406 can be specifically designed to fit proprietary removable batteries of the unmanned aerial vehicle 105. In some embodiments, the base station 102 may include one or more connectors or other charging mechanisms (e.g., inductive charging) instead of or in addition to the battery charger slots 406.

In the illustrated example, the command interface 114 is implemented with physical buttons. If the base station 102 is implemented as a portable in-field unit, it can be advantageous to include the command interface 114 configured to receive user inputs and initiate sending critical command signals, such as recovery initiation, emergency landing, starting, restarting, or pausing a mission, shutting off propellers, and/or returning to the takeoff location or another designated location. In some embodiments, the command interface 114 may include a display and software "buttons" or menus, or any other tactile, physical, or auditory means to receive user commands.

Figure 5:
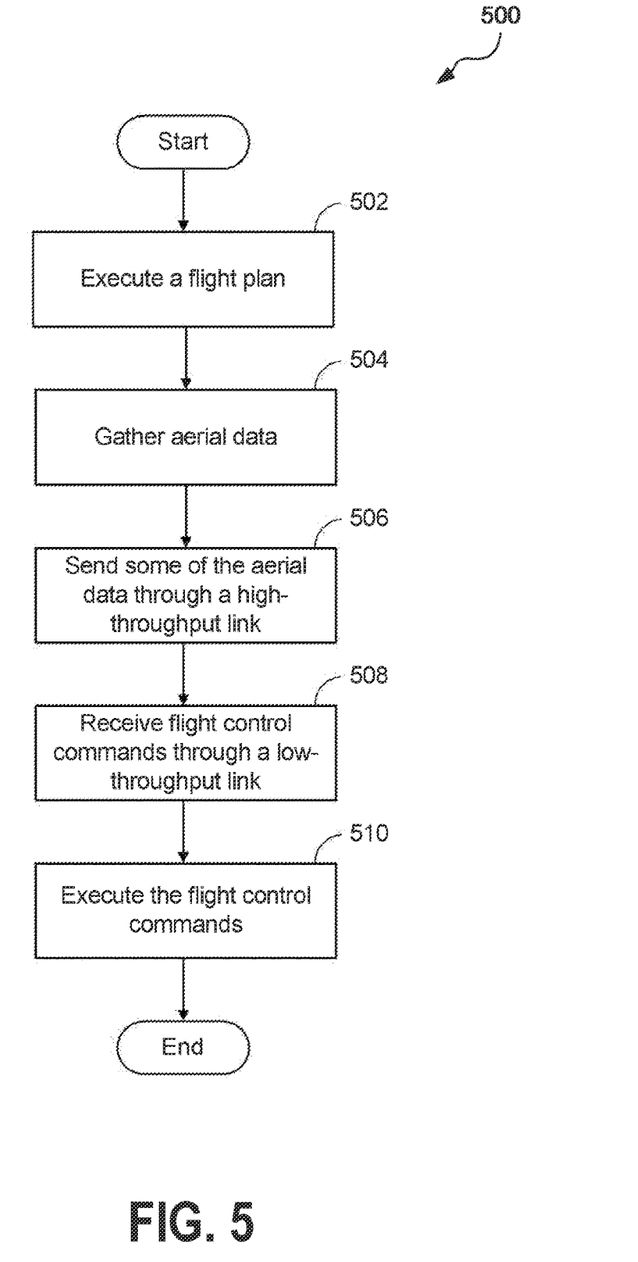
FIG. 5 is a flowchart for an example unmanned aerial vehicle operation and communication process according to one embodiment.

FIG. 5 is a flowchart for an example unmanned aerial vehicle operation and communication process according to one embodiment. The illustrated process 500 can be performed in part by one or more modules in the unmanned aerial vehicle 105 (FIGS. 1-3), such as the processor 310 (FIG. 3), the sensors 310 (FIG. 3), and the transceivers 308 (FIG. 3). It is to be noted that all or parts of steps 502, 504, 506, 508, and 510 may be concurrently, continuously, periodically, intermittently, repeatedly, or iteratively performed in a variety of sequences, and the illustrated process in FIG. 5 is only one example according to one embodiment. As the unmanned aerial vehicle 105 is powered up and receives a mission to perform, the process 500 may proceed to step 502.

In step 502, the unmanned aerial vehicle 105 begins to execute a flight plan to accomplish the received mission. As discussed in connection with FIG. 2 above, the unmanned aerial vehicle 105 may follow a flight path to accomplish its mission. For example, the mission may be to gather hourly aerial images of a designated area. To execute this example mission, the unmanned aerial vehicle 105 may fly to the designated area and start a flight in a sweeping manner and begin to gather aerial images.

In step 504, the unmanned aerial vehicle 105 gathers data as it performs its mission. The unmanned aerial vehicle 105 may gather data specific to its mission (e.g., aerial video, audio, or images, infrared or LIDAR as indicated by the mission), and in other implementations, the unmanned aerial vehicle 105 may be configured to gather a default set of data generally helpful for automated flight, flight history recording, quality control, error checking, telemetry or any other operational data. Some of the data gathered by the unmanned aerial vehicle 105 may be more critical to the operation of the unmanned aerial vehicle 105 than others.

In step 506, the unmanned aerial vehicle 105 sends some of the gathered aerial data to the base station 102. As discussed above in connection with FIG. 2, depending on the necessity, urgency, and throughput availability, some of the gathered data can be communicated to the base station 102 (FIGS. 1-3) using a high-throughput link. As the unmanned aerial vehicle 105 travels along a flight path and gathers data, it may at least from time to time be able to establish a high-throughput communication link with the base station 102. As disclosed herein, the unmanned aerial vehicle 105 can be configured to send large volume data whenever it can or has an opportunity to establish a high-throughput communication link with the base station 102, hence in an opportunistic manner.

In step 508, as the unmanned aerial vehicle 105 flies along a flight path, gathers aerial data, and opportunistically sends some of the aerial data using a high-throughput link, the unmanned aerial vehicle 105 may receive flight control commands using a low-throughput link. As discussed in connection with FIG. 2 above, the low-throughput communication between the unmanned aerial vehicle 105 and the base station 102 can be continuous throughout the mission. In some instances, interruptive commands, such as emergency landing, can also be communicated from the base station 102 to the unmanned aerial vehicle 105 during the mission. For example, according to one embodiment, the unmanned aerial vehicle 105 may perform its mission according to a predetermined flight path, but an arising event may not have been taken into account when the predetermined flight path was configured. In such instances, the user can initiate an alternative course of action using the command interface 114 (FIGS. 1-3) of the base station 102 to communicate a command signal to unmanned aerial vehicle 105 using a low-throughput link.

In step 510, upon receiving a command using a low-throughput link, the unmanned aerial vehicle 105 can execute the command. In the above example, the unmanned aerial vehicle 105 can be instructed via a low-throughput link to make an emergency landing. Accordingly, the unmanned aerial vehicle 105 may suspend performing its planned mission and make an emergency landing.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the Figures depict example arrangements of elements and components, additional intervening elements, devices, features, or components may be present in an actual embodiment (assuming that the functionality of the depicted circuits is not adversely affected).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the implementations are not limited to the precise configuration and components illustrated above. Various modifications, changes and variations may be made in the arrangement, operation and details of the methods and apparatus described above without departing from the scope of the implementations.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well.

What is claimed is:

1. A system comprising:
an unmanned aerial vehicle;
a base station comprising:
   a housing;
   a first wireless communication circuit configured to send flight command signals to the unmanned aerial vehicle using a first communication link with a first throughput capacity and a first range; and
   a second wireless communication circuit configured to receive aerial data from the unmanned aerial vehicle using a second communication link with a second throughput capacity and a second range, wherein the second throughput capacity is higher than the first throughput capacity and wherein the second range is less than the first range; and
a user interface device configured to generate and send a flight plan or components thereof to the base station for forwarding to the unmanned aerial vehicle,
wherein the unmanned aerial vehicle is configured to cease sending aerial data when travelling outside of the second range; and
wherein the unmanned aerial vehicle is configured to continue receiving flight command signals when travelling outside of the second range and inside of the first range.

2. The system of claim 1, wherein the first communication link has a lower probability of failure than the second communication link.

3. The system of claim 1, wherein the first communication link comprises a 900 MHz band channel and the second communication link comprises a Wi-Fi channel.

4. The system of claim 1, wherein the base station further comprises a third wired or wireless communication circuit configured to send the received aerial data to a remote server.

5. The system of claim 1, wherein the aerial data comprises at least one of:
- image data;
- video data;
- audio data;
- telemetry data;
- LIDAR data;
- 3D mapping data; and
- gas sensor data;
- wherein the aerial data are gathered by the unmanned aerial vehicle.

6. The system of claim 1, wherein the base station comprises manual actuators that command the unmanned aerial vehicle to perform at least one of:
- emergency landing;
- shutdown propellers;
- travelling to a predetermined location;
- pausing a mission; and
- resuming a paused mission,
- wherein one or more manual inputs initiate sending one or more command signals to the unmanned aerial vehicle from the base station through the first communication link.

7. The system of claim 1, wherein the first wireless communication circuit is configured to receive data from the unmanned aerial vehicle using the first communication link.

8. The system of claim 7, wherein the first wireless communication circuit is configured to receive aerial data from the unmanned aerial vehicle using the first communication link.

9. The system of claim 8, wherein the unmanned aerial vehicle is configured to select portions of the aerial data for sending over the first communication link.

10. The system of claim 1, wherein the unmanned aerial vehicle is configured to determine a position of the unmanned aerial vehicle relative to the base station.

11. The system of claim 10, wherein the unmanned aerial vehicle is further configured to send the aerial data to the second wireless communication circuit based at least in part on the position of the unmanned aerial vehicle.

12. The system of claim 1, wherein the unmanned aerial vehicle contains an on-board communication circuit configured to establish the second communication link and send the aerial data to the second wireless communication circuit when the unmanned aerial vehicle is within a threshold range of the second wireless communication circuit.

* * * * *